United States Patent [19]

Welle et al.

[11] 4,221,425
[45] Sep. 9, 1980

[54] VAN ATTACHMENT

[76] Inventors: John J. Welle; James O. Kerner, both of 326 Brown, Collinsville, Ill. 62234

[21] Appl. No.: 955,894

[22] Filed: Oct. 30, 1978

[51] Int. Cl.² .............................................. B60P 3/32
[52] U.S. Cl. .................................. 296/163; 296/24 R; 296/146; 296/159
[58] Field of Search .................. 296/163, 156, 26, 24, 296/146, 50, 56, 176, 137 B, 159; 49/501; 52/68, 69, 29, 32; 312/291, 292, 138; 5/119

[56] References Cited

U.S. PATENT DOCUMENTS

| 1,849,732 | 3/1932 | Nickels | 296/26 |
|---|---|---|---|
| 2,214,575 | 9/1940 | Cercownay | 296/26 |
| 3,511,529 | 5/1970 | Cutsinger | 52/69 |
| 3,633,324 | 1/1972 | Cuylits | 296/26 |
| 3,730,580 | 5/1973 | Page | 296/26 |
| 3,800,484 | 4/1974 | Marshall | 52/69 |
| 3,811,723 | 5/1974 | Anderson | 296/26 |
| 3,888,539 | 6/1975 | Niessner | 296/156 |
| 3,968,809 | 7/1976 | Beavers | 135/3 A |
| 4,104,825 | 8/1978 | Hosmer | 296/137 B |
| 4,127,302 | 11/1978 | Green | 296/137 B |

Primary Examiner—Robert R. Song
Attorney, Agent, or Firm—Senniger, Powers, Leavitt and Roedel

[57] ABSTRACT

An attachment for a motor vehicle, such as a van, having an opening at the back of the van for entry into and exit from the van. The attachment comprises a frame adapted to be fitted into the opening and secured to the van, a cover hinged to the top of the frame for swinging on the frame about a generally horizontal axis between a lowered position in which it extends down along the back of the van from the top to the bottom of the frame for covering the opening, and a raised position in which it extends generally horizontally rearwardly from the van to provide a roof to the rear of the van, and a rack hinged to the frame at one side thereof for swinging on the frame about a generally vertical axis between a first position in which it is forward of the cover when the latter is in its lowered position, and a second position in which it extends rearwardly from the vehicle below the cover when the latter is in its raised position.

18 Claims, 10 Drawing Figures

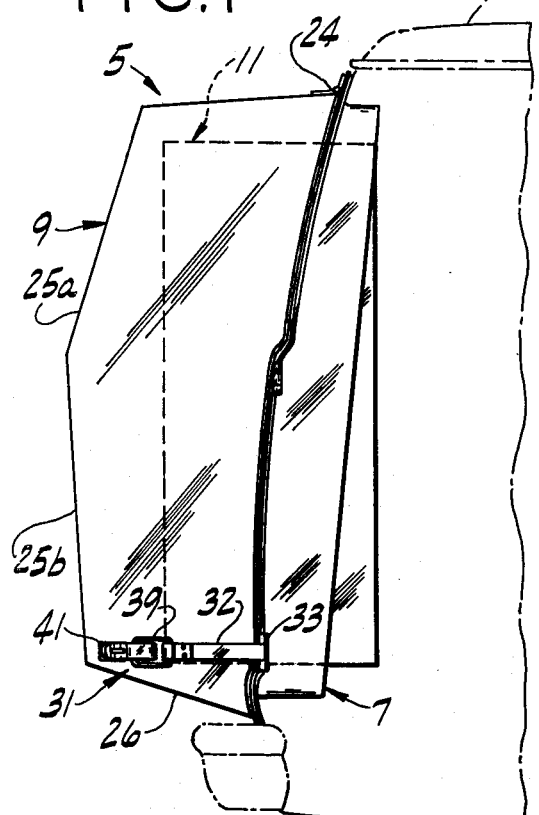
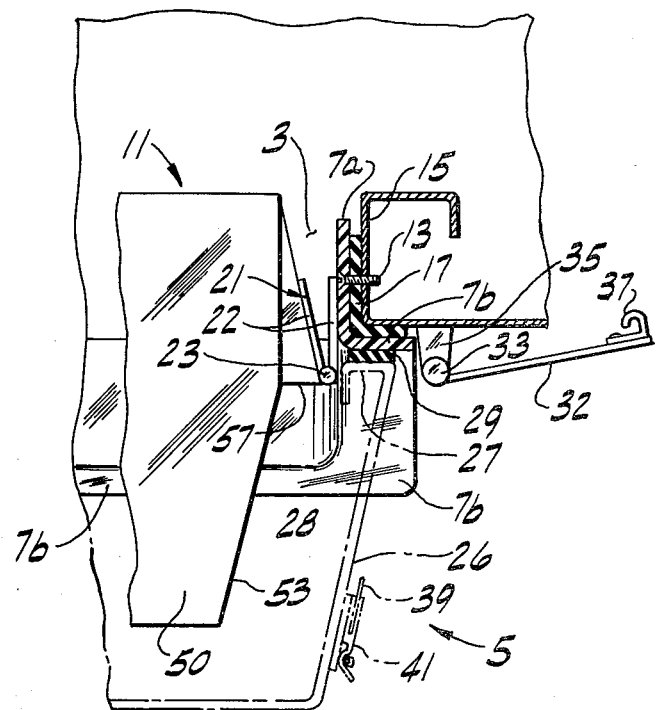
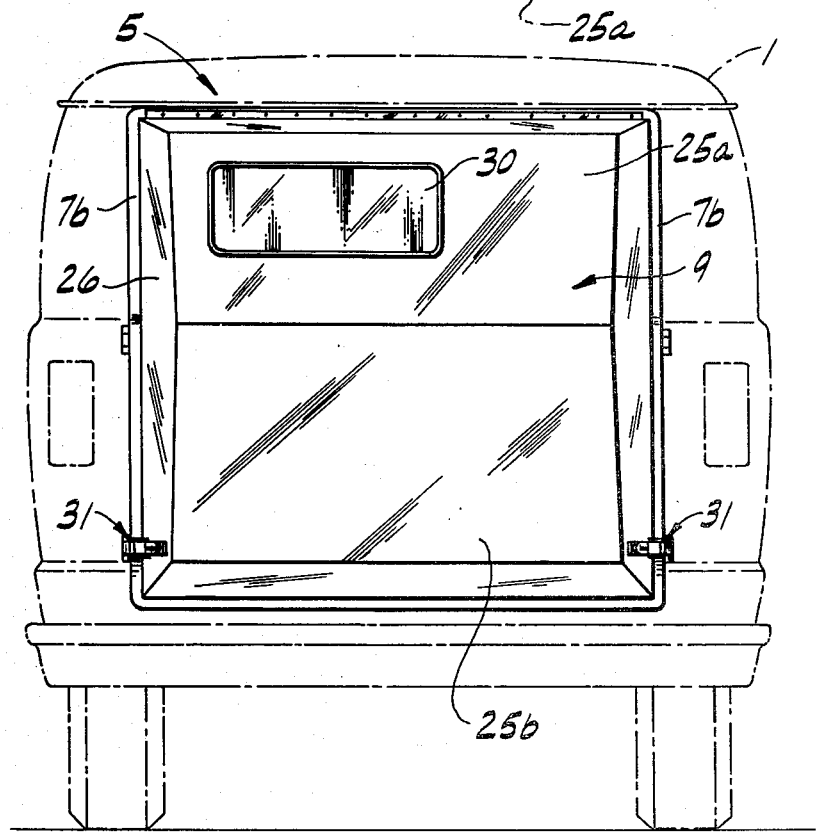

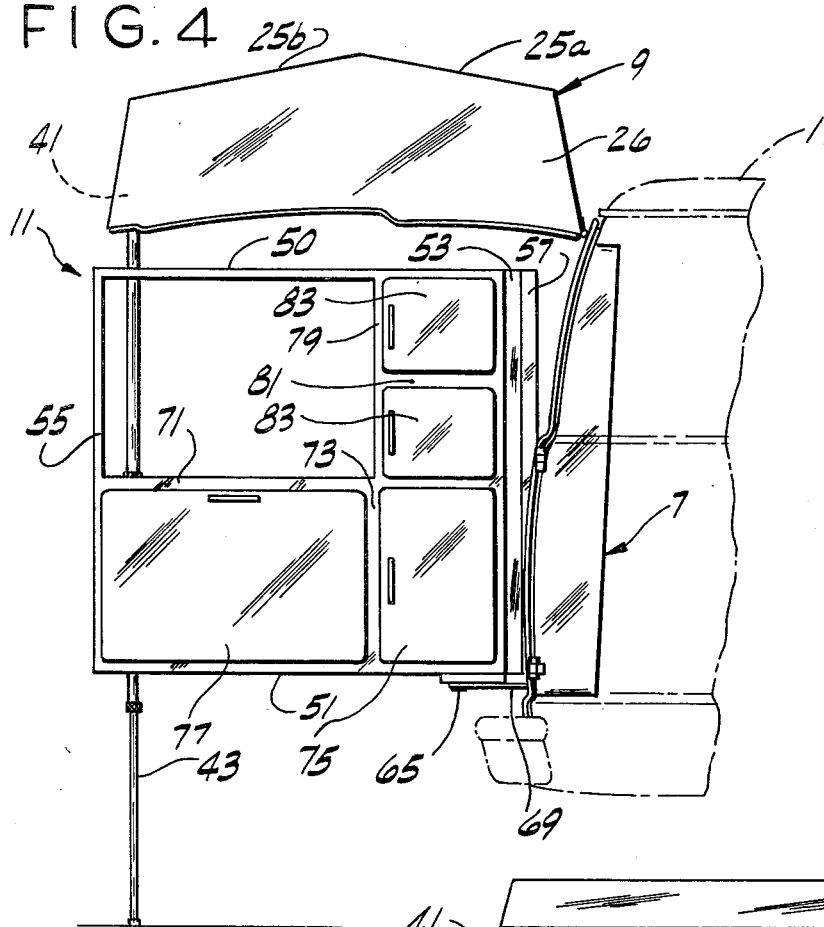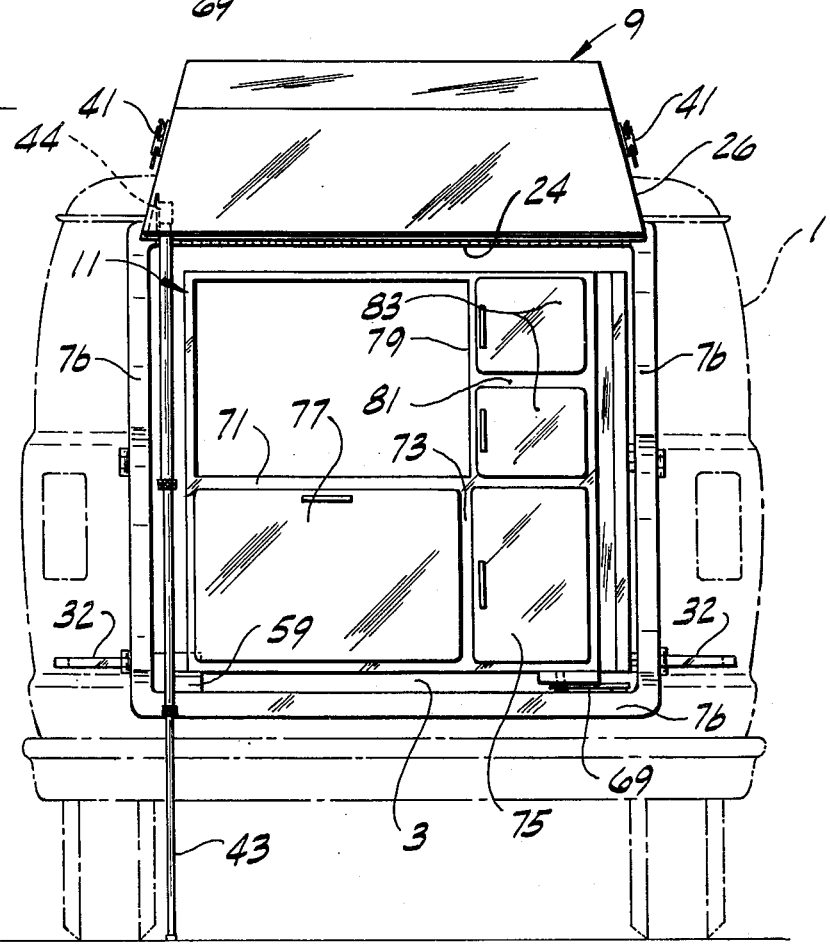

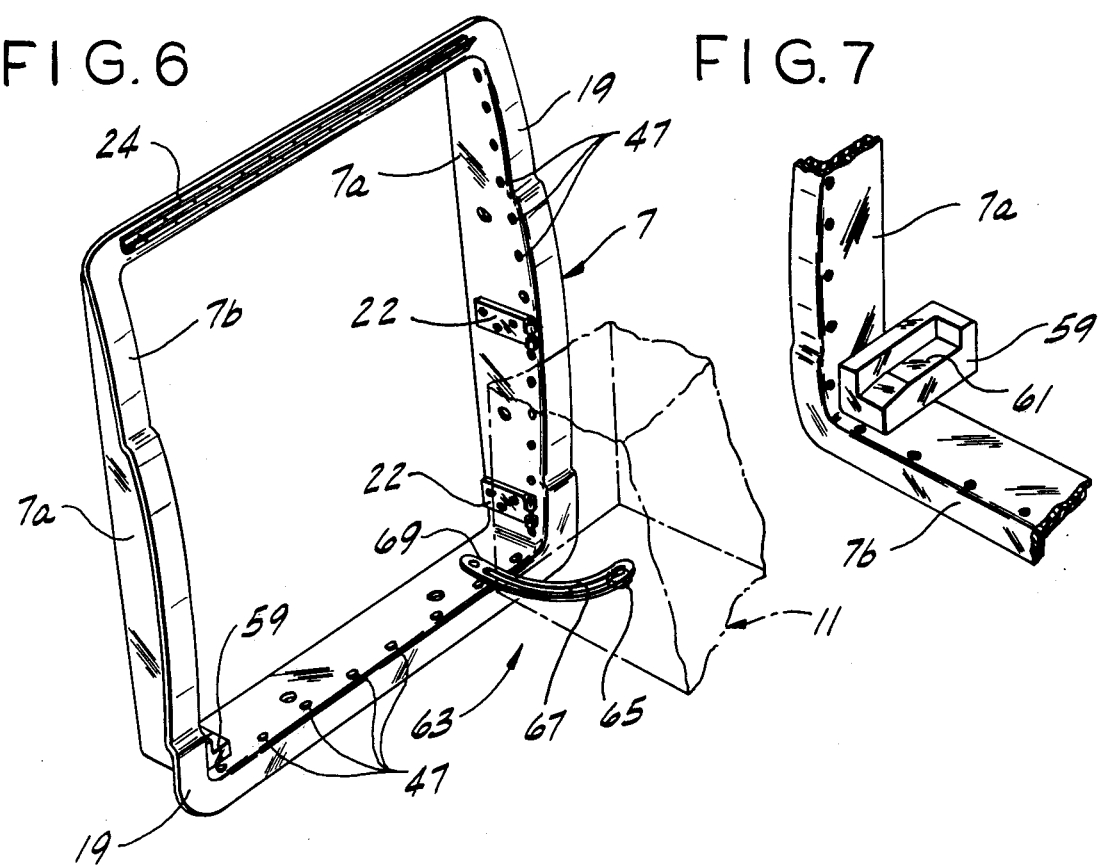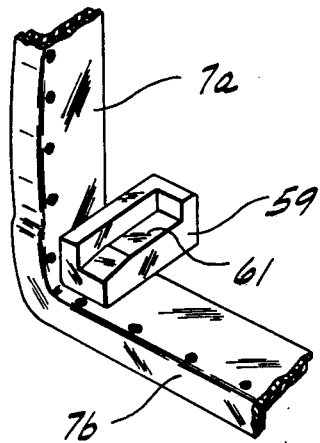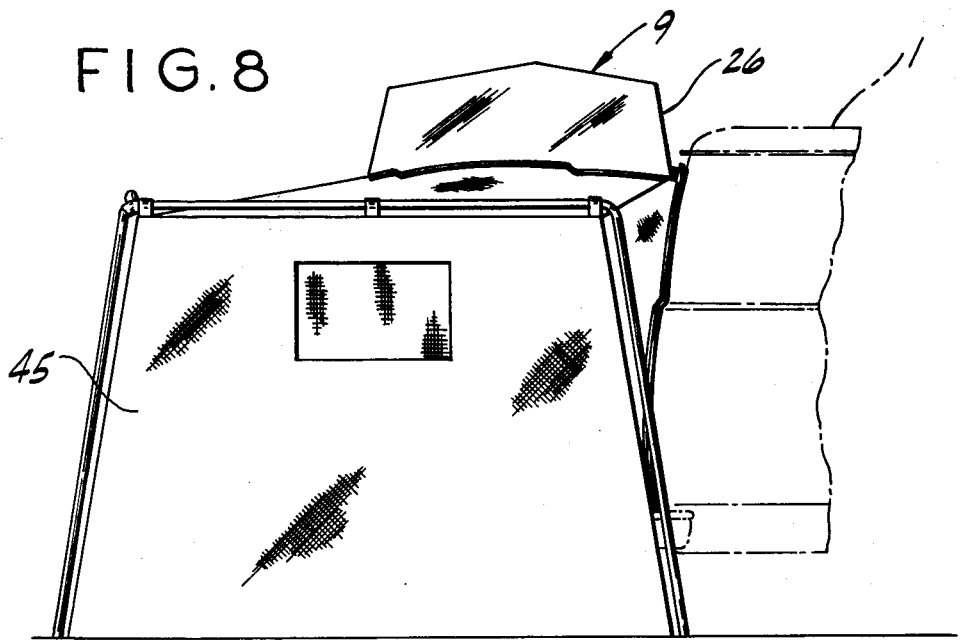

VAN ATTACHMENT

BACKGROUND OF THE INVENTION

This invention relates generally to an attachment for a van-type motor vehicle, and more particularly to an attachment for equipping a van for camping, fishing and other outdoor activities. Heretofore, mobile campers especially designed for such activities have been widely used, but these campers have been relatively expensive and unsuited in many respects for day-to-day use. Reference may be made to U.S. Pat. Nos. 1,849,732, 3,730,580 and 3,888,539 for subject matter generally in the field of this invention.

Summary of the Invention

Among the several objects of this invention may be noted the provision of an attachment for a van-type motor vehicle which adapts a van for outdoor excursions; the provision of such an attachment which is readily installed on a van; the provision of such an attachment which is adapted to provide an overhead shelter to the rear of the van; the provision of such an attachment which readily accommodates camping provisions and facilities; and the provision of such an attachment which is pleasing in appearance.

Generally, an attachment of this invention is for a motor vehicle, such as a van, having an opening at the back of the van for entry into and exit from the van. The attachment comprises a frame adapted to be fitted into the opening and secured to the van, and a cover hinged to the top of the frame for swinging on the frame about a generally horizontal axis between a lowered position in which it extends down along the back of the van from the top to the bottom of the frame for covering the opening, and a raised position in which it extends generally horizontally rearwardly from the van to provide a roof to the rear of the van. The attachment further comprises a rack hinged to the frame at one side thereof for swinging on the frame about a generally vertical axis between a first position in which it is forward of the cover when the latter is in its lowered position, and a second position in which it extends rearwardly from the vehicle below the cover when the latter is in its raised position. Other objects and features will be in part apparent and in part pointed out hereinafter.

BRIEF DESCRIPTION OF THE DRAWINGS

FIG. 1 is a side elevation of an attachment of this invention installed on the back of a van (shown in phantom);

FIG. 2 is a rear elevation of FIG. 1;

FIG. 3 is an enlarged plan of a portion of FIG. 1 with portions broken away to illustrate details;

FIG. 4 is a view similar to FIG. 1 showing the cover of the attachment in a raised position and a rack of the attachment swung out of the van;

FIG. 5 is a view similar to FIG. 2 showing the cover in a raised position and the rack in the opening at the back of the van;

FIG. 6 is a perspective of a frame of the attachment adapted to fit into the opening at the back of the van;

FIG. 7 is an enlarged perspective of a portion of FIG. 6;

FIG. 8 is a side elevation showing an optional feature of the attachment of this invention;

Corresponding reference characters indicate corresponding parts throughout the several views of the drawings.

DESCRIPTION OF THE PREFERRED EMBODIMENT

Figure 9:
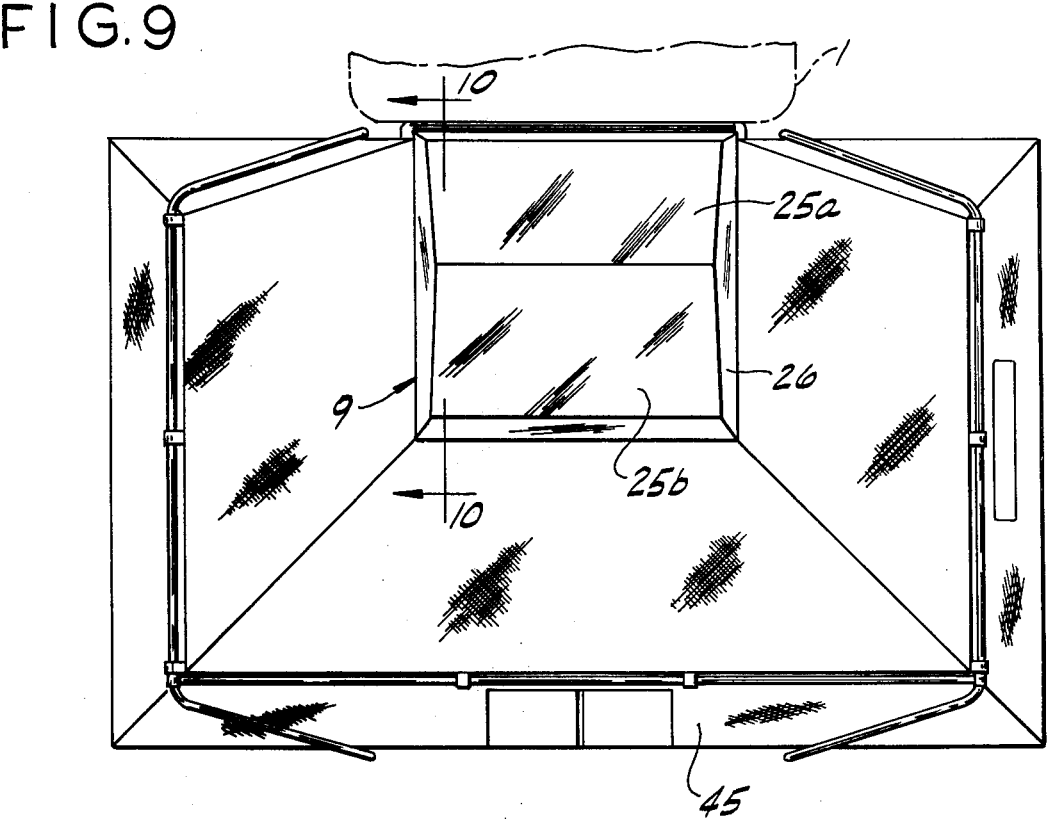
FIG. 9 is a plan of FIG. 8.
Figure 10:
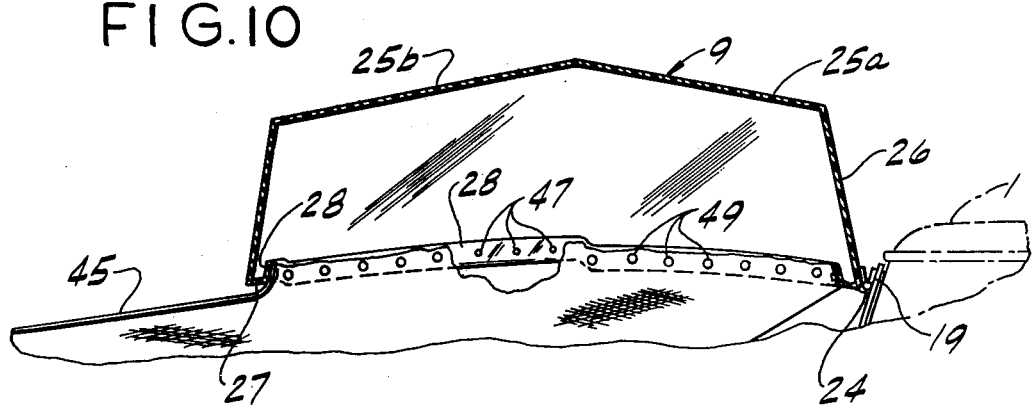
FIG. 10 is an enlarged section on line 10—10 of FIG. 9.

FIGS. 1-3 illustrate a conventional van 1 (shown in phantom) having a generally rectangular opening 3 at its back for entry into and exit from the van. An attachment of this invention for the van is indicated in its entirety at 5 and is shown to comprise a frame 7 fitted into the opening 3 and secured to the van, and a cover, indicated generally at 9, hinged to the top of the frame for swinging on the frame about a generally horizontal axis between a lowered position (FIGS. 1-3) in which it extends down along the back of the van from the top to the bottom of the frame 7 for covering the opening 3, and a raised position (FIGS. 4 and 5) in which it extends generally horizontally rearwardly from the van to provide an overhead shelter or roof to the rear of the van. The attachment 5 also includes a rectangular open framework or rack, generally designated 11, hinged to the frame at one side thereof (the right side as viewed in FIGS. 3 and 5) for swinging on the frame about a generally vertical axis between a first position in which it is in the opening 3 and forward of the cover when the latter is in its lowered position, and a second position in which it extends rearwardly from the van below the cover when the cover is in its raised position, entry into and exit from the van via opening 3 being possible when the rack is in this latter position. As will appear, the rack 11 is constructed for holding a variety of kitchen appliances, provisions and other camping gear or the like.

More particularly, frame 7 is generally a rectangular thin-wall frame of sufficient strength to support the cover 9 and rack 11. The frame may be, for example, a one-piece molded frame of reinforced fiberglass. As shown best in FIG. 3, the frame is generally L-shaped in cross section, having a portion 7a dimensioned for a relatively snug fit in the opening 3 for securement by screws 13 or other suitable fasteners to the jambs 15 of the van at the sides of the opening, and a flange portion 7b extending generally at right angles to frame portion 7a at the periphery of the frame. As shown, this flange portion 7b is disposed in fact-to-face relation with the back of the van on the outside of the van around the opening 3. A gasket 17, also generally L-shaped in cross section, between portions 7a and 7b of the frame and the van provides a water-tight seal. Secured, as by screws, to frame portion 7a at the right side of the frame are two hinges, each generally designated 21 (FIGS. 3 and 6), for detachably mounting the rack 11 on the frame for swinging about a vertical axis generally at the intersection of frame portions 7a and 7b. More particularly, each hinge 21 comprises two plates or leaves 22, one secured to the frame 7 and the other to the rack 11, and a pin 23 joining the two leaves. It shall be understood, of course, that a single elongate hinge could also be used instead of two separate hinges as shown. However, for reasons which will be set forth hereinafter, the hinge should be such as to allow ready removal of the rack from the frame. Indicated at 23 is a piano hinge secured adjacent the upper edge of flange portion 7b for swingably mounting the cover 5 on the frame 7. Other types of hinges may also be suitable.

The cover 9, which is preferably of a lightweight high-strength plastic, such as fiberglass, comprises a panel having upper and lower sections 25a, 25b and a rim 26 at the periphery of the panel. This rim, which is generally rectangular in shape, is connected along its upper edge to the hinge 23 extending horizontally along the upper edge of flange portion 7b of the frame 7 for mounting the cover to swing between its aforesaid raised and lowered positions. The cover is sized so that when it is in its lowered position in which the panel 25 is spaced rearwardly of the opening 3, the rim 26 engages flange portion 7b around the entire periphery of the frame. In this connection, it shall be observed that the outer margins 27 of the rim are directed inwardly generally at right angles to the rim, forming a lip 27, the outer portion 28 of which is bent back generally parallel to the rim. A gasket 29, constituting gasket means, is secured to the lip 27 around the entire rim and is engageable with flange portion 7b of the frame 7 when the cover is in its lowered position for providing a watertight seal between the rim and the frame around the opening 3. Optionally, the upper section 25a of panel 25 of the cover 9 has a window 30 therein for providing greater visibility to the rear of the van when the cover is in its lowered position, as during travel. As will be more fully explained hereinafter, the rack 11 is formed so as not to block visibility through this window.

A latching means, indicated generally at 31, is provided at each side of the cover for latching it in its lowered position. This means comprises a latching bar 32 pinned at one end at 33 in a lower existing door hinge 35 of the van and having at its other end a J-shaped keeper 37 for receiving the U-shaped wire bail 39 of a standard draw-pull catch 41 mounted on the rim 26 of the cover (FIGS. 1 and 3). When the cover is in its raised position, the latching bar 32 may be swung to a position against the back of the van (FIG. 5).

The cover 9 is supported in its raised position in which it extends generally horizontally rearwardly from the van by a leg 43 at the outer end of the cover. This leg, which is preferably axially adjustable (e.g., telescoping) for supporting the cover in a generally horizontal position on uneven terrain, is pivotably mounted at its upper end on the inside of the rim 26 of the cover, as indicated at 44, for swinging between an unfolded position (FIG. 5) in which it extends vertically downwardly from the cover to the ground, and a folded position in which it is swung up alongside the rim on the inside of the latter so that the cover may be swung down to its lowered position.

In its raised position, the cover provides a roof to the rear of the van. Moreover, as shown in FIGS. 8 and 9, it is adapted to support a tent 45 at its sides and outer end when in this position, with the tent extending down from the cover for providing an enclosed shelter beneath the cover at the rear of the van. In this connection, a plurality of male elements 47, each of a typical snap-fastener assembly, are provided on the outer portion 28 of lip 27 of the rim 26 of the cover 9 and along the sides of the frame 7 for receiving the mating female elements 49 on the tent thereby to snap fasten the tent to the cover. It will, of course, be understood that the male and female elements, which together constitute interengageable snap fastener means, could be reversed with the male elements being on the tent and the female elements on the cover.

As stated above, the rack 11 is generally rectangular in shape, having a top 50, a bottom 51 and opposing sides 53, 55, and is connected at one of its sides, side 53, to the hinges 21 at the side of the frame for swinging between its aforesaid first position (FIG. 3) in which it is compactly received inside the cover when the latter is in its lowered position, to its aforesaid second position (FIG. 4) in which it extends rearwardly from the van beneath the cover when the cover is raised. As shown best in FIG. 3, side 53 of the rack is of a shallow-V shape and has an elongate hinge support 57, generally of wedge shape in section, secured vertically thereto. The hinges 21 are fastened to this support 57, thus providing the necessary clearance between the rack and the van so as to enable the rack to be swung in and out of the van. The bottom of the rack is engageable with a stop block 59 secured to the inside of frame portion 7a at the bottom of the frame for limiting swinging of the rack toward the front of the van. As shown, this block is notched to provide a shoulder 61, the lower corner of the rack 11 being adapted to rest on this shoulder for relieving some of the stress on the strap hinges 21. This is especially important when the van is on the move over uneven surfaces.

Indicated generally at 63 in FIG. 6 is means for limiting the outward swing of rack 11. More particularly, this means comprises a pin 65 on the bottom 51 of the rack movable in an elongate slot 67 in an arcuate guide bar 69, the latter being secured at one end (its left end as viewed in FIG. 6) to the bottom of the frame. The engagement of pin 65 with the guide bar at the right end of slot 67 prevents the rack from swinging past its aforesaid second position, i.e., the position shown in FIGS. 4 and 6. Although not illustrated, the right end of slot 67 may be formed (e.g., tapered) so that on swinging the rack to its second position, the pin becomes wedged in that end of the slot to hold the rack in position.

A shelf 71 spaced above the bottom 51 of the rack extends between opposite sides 53, 55 of the rack, providing a counter which may, for example, have a portable sink (not shown) installed therein. A vertical partition 73 extending down from the shelf 71 to the bottom 51 of the rack divides the lower portion of the rack into two compartments for housing appliances, a fuel supply or other camping articles. Doors 75, 77 close the compartments at the front of the rack, and one of the doors, such as door 77, is preferably hinged to the bottom 51 of the rack so that it may be swung down to provide additional counter space. Another partition 79 extending down from the top 50 of the rack to the shelf 71, and a shelf 81 extending between this partition and the right side of the rack (as viewed in FIGS. 4 and 5), provide still more cabinet space for the storage of provisions or the like. Doors 83 close this cabinet space at the front of the rack. It will be understood that other doors similar to doors 75, 77 and 83 close the compartments and cabinet space at the rear of the rack (not shown in the drawings), thus providing access to the appliances and provisions in the rack 11 from the interior of the van during travel. It will also be observed that since the space in the rack above shelf 71 and to the left (as viewed in FIGS. 4 and 5) of partition 79 is open, there is an unobstructed view from inside the van through the optional window 30 in the cover 9.

By removal of the pins 23 from hinges 21, rack 11 may be removed from attachment to frame 7, thus facilitating cleaning, repair or the like of any structures or appliances carried by the rack. It will further be understood that the motor vehicle attachment 5 of this invention is adapted for installation with any of a variety of different rack units or modules, each arranged for a specific use. Thus, for example, the rack 11 shown in the drawings can be removed and a utility repair unit adapted for use by an electrician, plumber, telephone repairman, etc., substituted in its place. Such flexiblity and susceptibility to multiple uses is one of the important practical advantages of the attachment 5.

In view of the foregoing, it will be observed that the attachment 5 of this invention equips a van with all the necessary furnishings for outdoor excursions, utility repair, supplies, etc. Thus rack 11 readily accommodates camping provisions and facilities, and the cover 9, when in a raised position, provides a shelter at the rear of the van. In addition, a tent may readily be attached to the cover 9 and frame 7 if so desired. It should also be noted that the attachment 5 may quickly and easily be installed on a van simply by removing the existing rear doors, securing the frame to the van in the opening, attaching the cover 9 and rack 11 to the frame, and pinning the latch bars 32 at opposite sides of the cover to the existing door hinges 35. Once installed, the attachment is pleasing in appearance for enhancing the attractiveness of the van.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:

1. An attachment for a motor vehicle, such as a van, having an opening at the back of the van for entry into and exit from the van, said attachment comprising:
   a frame adapted to be fitted into said opening and secured to the van,
   a cover hinged to the top of the frame for swinging on the frame about a generally horizontal axis between a lowered position in which it extends down along the back of the van from the top to the bottom of the frame for covering the opening, and a raised position in which it extends generally horizontally rearwardly from the van to provide a roof to the rear of the van,
   a rack comprising a framework for holding equipment or the like hinged to the frame at one side of the frame for swinging on the frame about a generally vertical axis between a first position in which it is forward of the cover when the latter is in its lowered position, and a second position in which it extends rearwardly from the van below the cover when the latter is in its raised position, and
   means for supporting the cover in its raised position thereby to enable the framework to be swung between its said first and second positions while the cover is in its raised position.

2. An attachment as set forth in claim 1 wherein said frame has an upwardly extending flange portion at its top adapted to extend in face-to-face relation with the back of the van on the outside of the van above the opening, said cover being hinged to the flange portion.

3. An attachment as set forth in claim 2 wherein said frame is generally rectangular in shape and said flange portion is around the entire periphery of the frame and adapted to extend in face-to-face relation with the back of the van on the outside of the van around said opening.

4. An attachment as set forth in claim 1 wherein said frame is of one-piece construction.

5. An attachment as set forth in claim 1 further including means for locking the cover in its lowered position.

6. An attachment as set forth in claim 1 wherein said cover comprises a panel and a rim at the periphery of the panel, said rim being hinged to the top of the frame for swinging of the cover between said lowered position in which the panel is spaced rearwardly of the opening and the rim engages the frame around the periphery of the frame, and said raised position.

7. An attachment as set forth in claim 6 wherein the outer margins of said rim are bent inwardly generally at right angles to the rim and have gasket means thereon engageable with the frame when the cover is in said lowered position for providing a watertight seal between the rim and the frame.

8. An attachment as set forth in claim 6 wherein said rim is relatively deep and said rack is at least partially received inside the cover when the rack is in said first position and the cover is in its lowered position.

9. An attachment as set forth in claim 8 wherein the rack is dimensioned for a relatively close fit in said cover.

10. An attachment as set forth in claim 1 wherein said rack further comprises shelf means in the framework.

11. An attachment as set forth in claim 10 wherein said framework is open.

12. An attachment as set forth in claim 1 wherein said supporting means comprises a leg pivotally mounted on the cover for swinging between an unfolded position in which it extends down from the cover when the latter is in its raised position for supporting the cover and a folded position in which the leg extends alongside the rim.

13. An attachment as set forth in claim 1 further comprising tent means, said tent means and cover having interengageable snap fastener means for fastening the tent means to the cover when the latter is in said raised position, said tent means being adapted to extend down from the cover to enclose the space beneath the cover at the rear of the van.

14. An attachment as set forth in claim 1 wherein said frame has stop means thereon engageable by the rack for limiting swinging of the rack toward the front of the van.

15. An attachment as set forth in claim 14 wherein said stop means comprises a stop block on the inside of the frame at the bottom of the frame engageable by the bottom of the rack at the other side of the rack.

16. An attachment as set forth in claim 1 wherein the rack is detachably hinged to the frame for ready removal of the rack from the frame, thereby facilitating cleaning or repair of the rack and substitution of different racks.

17. An attachment for a motor vehicle, such as a van, having an opening at the back of the van for entry into and exit from the van, said attachment comprising a molded plastic frame having a shape substantially identical to that of the opening and being dimensioned for a relatively close fit in the opening for securement to the van, said frame having a flange portion around its entire periphery adapted to extend in face-to-face relation with the back of the van on the outside of the van for securement thereto of a cover for covering said opening at the back of the van, a hinge on said flange portion at the top of the frame for mounting said cover on the frame for swinging about a generally horizontal axis, a hinge on the frame at a side of the frame for mounting a rack on the frame for swinging about a generally vertical axis, and stop means on the frame engageable by the rack for limiting swinging of the rack toward the front of the van.

18. An attachment as set forth in claim 17 wherein said stop means comprises a stop block on the inside of the frame at the bottom of the frame engageable by the bottom of the rack.

* * * * *